(12) United States Patent
Bunea et al.

(10) Patent No.: US 12,476,585 B2
(45) Date of Patent: Nov. 18, 2025

(54) ELECTRICAL COMPONENTS FOR PHOTOVOLTAIC SYSTEMS

(71) Applicant: GAF Energy LLC, Parsippany, NJ (US)

(72) Inventors: Gabriela Bunea, San Jose, CA (US); Thierry Nguyen, San Francisco, CA (US); Lewis Abra, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/802,711

(22) Filed: Aug. 13, 2024

(65) Prior Publication Data

US 2025/0047239 A1 Feb. 6, 2025

Related U.S. Application Data

(63) Continuation of application No. 17/703,671, filed on Mar. 24, 2022, now Pat. No. 12,095,415.

(60) Provisional application No. 63/167,475, filed on Mar. 29, 2021.

(51) Int. Cl.
*H02S 40/34* (2014.01)
*H02S 20/23* (2014.01)
*H02S 40/32* (2014.01)

(52) U.S. Cl.
CPC ............. *H02S 40/34* (2014.12); *H02S 20/23* (2014.12); *H02S 40/32* (2014.12)

(58) Field of Classification Search
CPC ..................................................... H02S 40/32
See application file for complete search history.

(56) References Cited

U.S. PATENT DOCUMENTS

| | | | |
|---|---|---|---|
| 1,981,467 A | 11/1934 | Radtke | |
| 3,156,497 A | 11/1964 | Lessard | |
| 3,581,779 A | 6/1971 | Gilbert, Jr. | |
| 4,258,948 A | 3/1981 | Hoffmann | |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Ryan S Cannon
(74) *Attorney, Agent, or Firm* — GREENBERG TRAURIG, LLP (57) ABSTRACT

A system includes at least one photovoltaic module installed on a roof deck, at least one electrical connector electrically connected to the photovoltaic module, and at least one electrical component electrically and removably connected to the electrical connector. The electrical component includes a housing and an electronic component located within the housing. The electronic component includes at least one of an optimizer, a rapid shutdown device, or an inverter. The electrical component is separate from the photovoltaic module and is configured to be disconnected from the electrical connector while the photovoltaic module remains installed on the roof deck.

16 Claims, 7 Drawing Sheets

(56) References Cited

U.S. PATENT DOCUMENTS

| | | |
|---|---|---|
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,291,036 B1 | 11/2007 | Daily et al. |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rodrigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko et al. |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |

(56) References Cited

U.S. PATENT DOCUMENTS

| | | |
|---|---|---|
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0110490 A1 | 5/2008 | Duesterhoeft |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0018135 A1 | 1/2010 | Croft et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0263704 A1 | 10/2010 | Fornage et al. |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0188486 A1 | 7/2015 | Marroquin |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0179876 A1 | 6/2017 | Freeman et al. |
| 2017/0237390 A1 | 8/2017 | Hudson et al. |
| 2017/0331415 A1 | 11/2017 | Koppi et al. |
| 2017/0353150 A1 | 12/2017 | Alon et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0219509 A1 | 8/2018 | Martinson et al. |
| 2018/0254738 A1 | 9/2018 | Yang et al. |
| 2018/0294765 A1 | 10/2018 | Friedrich et al. |
| 2018/0331652 A1 | 11/2018 | Okawa et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |
| 2022/0224240 A1 | 7/2022 | Takagi |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |

(56) References Cited

FOREIGN PATENT DOCUMENTS

| | | |
|---|---|---|
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home> retrieved Nov. 1, 2021.

ELECTRICAL COMPONENTS FOR PHOTOVOLTAIC SYSTEMS

CROSS-REFERENCE TO RELATED APPLICATION

This application is a continuation of commonly-owned, co-pending U.S. patent application Ser. No. 17/703,671, filed Mar. 24, 2022, entitled "ELECTRICAL COMPONENTS FOR PHOTOVOLTAIC SYSTEMS," which claims the benefit of commonly-owned, U.S. Provisional Patent Application Ser. No. 63/167,475, filed Mar. 29, 2021, entitled "ELECTRICAL COMPONENTS FOR PHOTOVOLTAIC SYSTEMS," the contents of which are incorporated herein by reference in their entirety.

FIELD OF THE INVENTION

The present invention relates to electrical components and, more particularly, electrical components having replaceable electronic components for photovoltaic systems.

BACKGROUND

Photovoltaic systems having solar panels are commonly installed on roofing of structures. What is needed are low profile electrical components with replaceable electronic components configured for use with photovoltaic systems installed on roof decks.

SUMMARY

In some embodiments, a system includes at least one photovoltaic module installed on a roof deck; at least one electrical connector electrically connected to the at least one photovoltaic module; and at least one electrical component electrically and removably connected to the at least one electrical connector, wherein the at least one electrical component includes a housing, and an electronic component located within the housing, wherein the electronic component includes at least one of an optimizer, a rapid shutdown device, or an inverter, wherein the at least one electrical component is separate from the at least one photovoltaic module, and wherein the at least one electrical component is configured to be disconnected from the at least one electrical connector while the at least one photovoltaic module remains installed on the roof deck.

In some embodiments, the electronic component is overmolded to the housing. In some embodiments, the housing includes a base and a cap removably attached to the base. In some embodiments, the electronic component is attached to the cap, and wherein the electronic component is removably attached to the base. In some embodiments, the cap includes at least one tab and the base includes at least one slot that is sized and shaped to removably receive the at least one tab. In some embodiments, the at least one tab includes a plurality of tabs and the at least one slot includes a plurality of slots each of which is sized and shaped to removably receive a corresponding one of the plurality of tabs. In some embodiments, the system further includes an O-ring attached to the cap. In some embodiments, the system further includes a gel located within the at least one slot. In some embodiments, the housing has a thickness of 1 mm to 30 mm.

In some embodiments, the system further includes at least one wireway installed proximate to an end of the at least one photovoltaic module, and wherein the at least one electrical component is located within the at least one wireway. In some embodiments, the system further includes at least one cover, wherein the at least one cover is removably attached to the at least one wireway, wherein the at least one cover includes an interior surface, wherein the at least one wireway includes an exterior surface, wherein the cap is attached to the interior surface of the at least one cover, and wherein the base is attached to the exterior surface of the at least one wireway.

In some embodiments, the at least one photovoltaic module includes a plurality of photovoltaic modules, and wherein the at least one electrical component includes a plurality of electrical components. In some embodiments, the at least one photovoltaic module includes first layer. In some embodiments, the first layer includes a polymer. In some embodiments, the polymer is selected from the group consisting of thermoplastic polyolefin (TPO), polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), and blends thereof. In some embodiments, the first layer includes a head lap, and wherein the at least one electrical component is located on the head lap. In some embodiments, at least a portion of a first one of the photovoltaic modules overlays at least a portion of the head lap of a second one of the photovoltaic modules, and wherein the at least one electrical component is located intermediate the at least a portion of the first one of the photovoltaic modules and the head lap of the second one of the photovoltaic modules. In some embodiments, the first layer includes a step flap, and wherein the at least one electrical component is located on the step flap. In some embodiments, at least a portion a first one of the photovoltaic modules overlays at least a portion of the step flap of a second one of the photovoltaic modules, and wherein the at least one electrical component is located intermediate the at least a portion of the first one of the photovoltaic modules and the step flap of the second one of the photovoltaic modules.

In some embodiments, a system includes at least one photovoltaic module installed on a roof deck; at least one electrical connector electrically connected to the at least one photovoltaic module; and at least one electrical component housing electrically connected to the at least one electrical connector, wherein the at least one electrical component housing includes a base and a cap, wherein the cap (a) is electrically and removably attached to the base, and (b) includes at least one electronic component located within the cap, and wherein the at least one electronic component includes at least one of an optimizer, a rapid shutdown device, or an inverter.

DETAILED DESCRIPTION

Figure 1:
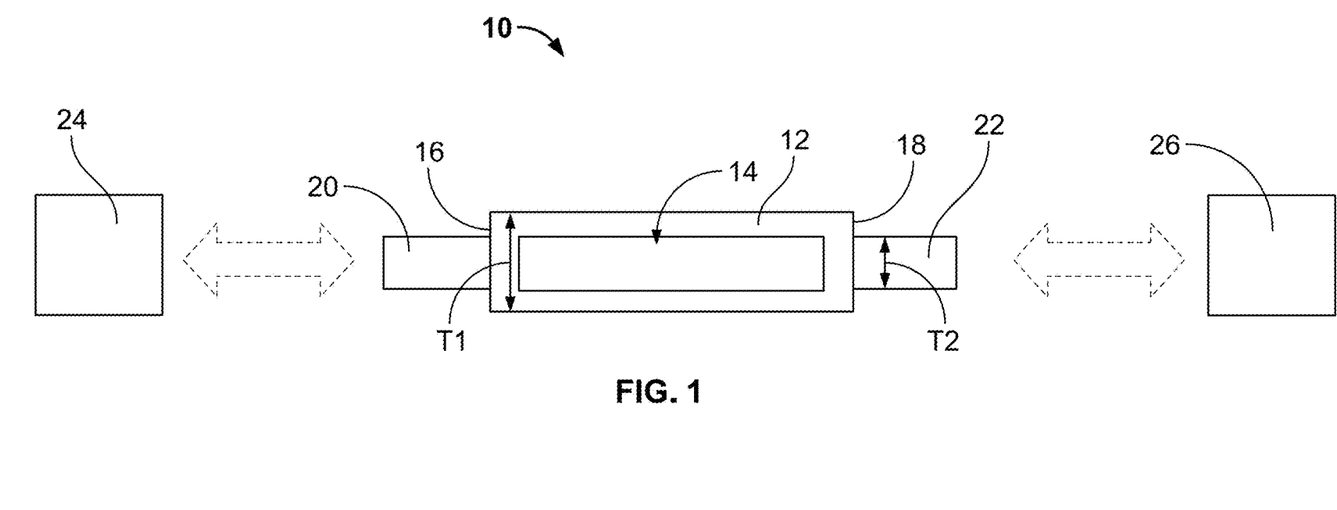
FIG. 1 is a schematic view of an embodiment of an electrical component.

Referring to FIG. 1, in an embodiment, an electrical component 10 includes a housing 12 and an electronic component 14 located within the housing 12. In some embodiments, the electronic component 14 is overmolded with the housing 12. In some embodiments, the electronic component 14 is embedded within the housing 12. As used herein, the term "embedded" means partially or fully enveloped or enclosed, and with respect to certain embodiments of the electrical component 10, the electronic component 14 is fully enveloped by or enclosed within the housing 12, or partially enveloped by or enclosed within the housing 12.

In some embodiments, an entire exterior surface area of the electronic component 14 is embedded within the housing 12. In some embodiments, 50% to 100% of an exterior surface area of the electronic component 14 is embedded within the housing 12. In some embodiments, 55% to 100% of an exterior surface area of the electronic component 14 is embedded within the housing 12. In some embodiments, 60% to 100% of an exterior surface area of the electronic component 14 is embedded within the housing 12. In some embodiments, 65% to 100% of an exterior surface area of the electronic component 14 is embedded within the housing 12. In some embodiments, 70% to 100% of an exterior surface area of the electronic component 14 is embedded within the housing 12. In some embodiments, 75% to 100% of an exterior surface area of the electronic component 14 is embedded within the housing 12. In some embodiments, 80% to 100% of an exterior surface area of the electronic component 14 is embedded within the housing 12. In some embodiments, 85% to 100% of an exterior surface area of the electronic component 14 is embedded within the housing 12. In some embodiments, 90% to 100% of an exterior surface area of the electronic component 14 is embedded within the housing 12. In some embodiments, 95% to 100% of an exterior surface area of the electronic component 14 is embedded within the housing 12.

In some embodiments, 50% to 95% of an exterior surface area of the electronic component 14 is embedded within the housing 12. In some embodiments, 55% to 95% of an exterior surface area of the electronic component 14 is embedded within the housing 12. In some embodiments, 60% to 95% of an exterior surface area of the electronic component 14 is embedded within the housing 12. In some embodiments, 65% to 95% of an exterior surface area of the electronic component 14 is embedded within the housing 12. In some embodiments, 70% to 95% of an exterior surface area of the electronic component 14 is embedded within the housing 12. In some embodiments, 75% to 95% of an exterior surface area of the electronic component 14 is embedded within the housing 12. In some embodiments, 80% to 95% of an exterior surface area of the electronic component 14 is embedded within the housing 12. In some embodiments, 85% to 95% of an exterior surface area of the electronic component 14 is embedded within the housing 12. In some embodiments, 90% to 95% of an exterior surface area of the electronic component 14 is embedded within the housing 12.

In some embodiments, 50% to 90% of an exterior surface area of the electronic component 14 is embedded within the housing 12. In some embodiments, 55% to 90% of an exterior surface area of the electronic component 14 is embedded within the housing 12. In some embodiments, 60% to 90% of an exterior surface area of the electronic component 14 is embedded within the housing 12. In some embodiments, 65% to 90% of an exterior surface area of the electronic component 14 is embedded within the housing 12. In some embodiments, 70% to 90% of an exterior surface area of the electronic component 14 is embedded within the housing 12. In some embodiments, 75% to 90% of an exterior surface area of the electronic component 14 is embedded within the housing 12. In some embodiments, 80% to 90% of an exterior surface area of the electronic component 14 is embedded within the housing 12. In some embodiments, 85% to 90% of an exterior surface area of the electronic component 14 is embedded within the housing 12.

In some embodiments, 50% to 85% of an exterior surface area of the electronic component 14 is embedded within the housing 12. In some embodiments, 55% to 85% of an exterior surface area of the electronic component 14 is embedded within the housing 12. In some embodiments, 60% to 85% of an exterior surface area of the electronic component 14 is embedded within the housing 12. In some embodiments, 65% to 85% of an exterior surface area of the electronic component 14 is embedded within the housing 12. In some embodiments, 70% to 85% of an exterior surface area of the electronic component 14 is embedded within the housing 12. In some embodiments, 75% to 85% of an exterior surface area of the electronic component 14 is embedded within the housing 12. In some embodiments, 80% to 85% of an exterior surface area of the electronic component 14 is embedded within the housing 12.

In some embodiments, 50% to 80% of an exterior surface area of the electronic component 14 is embedded within the housing 12. In some embodiments, 55% to 80% of an exterior surface area of the electronic component 14 is embedded within the housing 12. In some embodiments, 60% to 80% of an exterior surface area of the electronic component 14 is embedded within the housing 12. In some embodiments, 65% to 80% of an exterior surface area of the electronic component 14 is embedded within the housing 12. In some embodiments, 70% to 80% of an exterior surface area of the electronic component 14 is embedded within the housing 12. In some embodiments, 75% to 80% of an exterior surface area of the electronic component 14 is embedded within the housing 12.

In some embodiments, 50% to 75% of an exterior surface area of the electronic component 14 is embedded within the housing 12. In some embodiments, 55% to 75% of an exterior surface area of the electronic component 14 is embedded within the housing 12. In some embodiments, 60% to 75% of an exterior surface area of the electronic component 14 is embedded within the housing 12. In some embodiments, 65% to 75% of an exterior surface area of the electronic component 14 is embedded within the housing 12. In some embodiments, 70% to 75% of an exterior surface area of the electronic component 14 is embedded within the housing 12.

In some embodiments, 50% to 70% of an exterior surface area of the electronic component 14 is embedded within the housing 12. In some embodiments, 55% to 70% of an exterior surface area of the electronic component 14 is embedded within the housing 12. In some embodiments, 60% to 70% of an exterior surface area of the electronic component 14 is embedded within the housing 12. In some embodiments, 65% to 70% of an exterior surface area of the electronic component 14 is embedded within the housing 12.

In some embodiments, 50% to 65% of an exterior surface area of the electronic component 14 is embedded within the housing 12. In some embodiments, 55% to 65% of an exterior surface area of the electronic component 14 is embedded within the housing 12. In some embodiments, 60% to 65% of an exterior surface area of the electronic component 14 is embedded within the housing 12. In some embodiments, 50% to 60% of an exterior surface area of the electronic component 14 is embedded within the housing 12. In some embodiments, 55% to 60% of an exterior surface area of the electronic component 14 is embedded within the housing 12. In some embodiments, 50% to 55% of an exterior surface area of the electronic component 14 is embedded within the housing 12.

In some embodiments, 50% of an exterior surface area of the electronic component 14 is embedded within the housing 12. In some embodiments, 55% of the exterior surface area of the electronic component 14 is embedded within the housing 12. In some embodiments, 60% of the exterior surface area of the electronic component 14 is embedded within the housing 12. In some embodiments, 65% of the exterior surface area of the electronic component 14 is embedded within the housing 12. In some embodiments, 70% of the exterior surface area of the electronic component 14 is embedded within the housing 12. In some embodiments, 75% of the exterior surface area of the electronic component 14 is embedded within the housing 12. In some embodiments, 80% of the exterior surface area of the electronic component 14 is embedded within the housing 12. In some embodiments, 85% of the exterior surface area of the electronic component 14 is embedded within the housing 12. In some embodiments, 90% of the exterior surface area of the electronic component 14 is embedded within the housing 12. In some embodiments, 95% of the exterior surface area of the electronic component 14 is embedded within the housing 12. In some embodiments, 100% of the exterior surface area of the electronic component 14 is embedded within the housing 12.

In some embodiments, the electronic component 14 includes a power optimizer. In some embodiments, the electronic component 14 includes an inverter. In some embodiments, the electronic component 14 includes a diode. In some embodiments, the electronic component 14 includes a rapid shutdown device (RSD). In some embodiments, the electronic component 14 is a component of a junction box.

In some embodiments, the housing 12 includes a first end 16 and a second end 18 opposite the first end 16. In some embodiments, a first connector 20 extends from the first end 16. In some embodiments, a second connector 22 extends from the second end 18. In some embodiments, the first connector 20 is configured to be connected to a first mating connector 24. In some embodiments, the second connector 22 is configured to be connected to a second mating connector 26. In some embodiments, the first mating connector 24 is electrically connected to a photovoltaic system. In some embodiments, the second mating connector 26 is electrically connected to a photovoltaic system.

In some embodiments, the housing 12 has a thickness T1 of 1 mm to 30 mm. In some embodiments, the housing 12 has a thickness T1 of 5 mm to 30 mm. In some embodiments, the housing 12 has a thickness T1 of 10 mm to 30 mm. In some embodiments, the housing 12 has a thickness T1 of 15 mm to 30 mm. In some embodiments, the housing 12 has a thickness T1 of 20 mm to 30 mm. In some embodiments, the housing 12 has a thickness T1 of 25 mm to 30 mm. In some embodiments, the housing 12 has a thickness T1 of 1 mm to 25 mm. In some embodiments, the housing 12 has a thickness T1 of 5 mm to 25 mm. In some embodiments, the housing 12 has a thickness T1 of 10 mm to 25 mm. In some embodiments, the housing 12 has a thickness T1 of 15 mm to 25 mm. In some embodiments, the housing 12 has a thickness T1 of 20 mm to 25 mm.

In some embodiments, the housing 12 has a thickness T1 of 1 mm to 20 mm. In some embodiments, the housing 12 has a thickness T1 of 5 mm to 20 mm. In some embodiments, the housing 12 has a thickness T1 of 10 mm to 20 mm. In some embodiments, the housing 12 has a thickness T1 of 15 mm to 20 mm. In some embodiments, the housing 12 has a thickness T1 of 1 mm to 15 mm. In some embodiments, the housing 12 has a thickness T1 of 5 mm to 15 mm. In some embodiments, the housing 12 has a thickness T1 of 10 mm to 15 mm. In some embodiments, the housing 12 has a thickness T1 of 1 mm to 10 mm. In some embodiments, the housing 12 has a thickness T1 of 5 mm to 10 mm. In some embodiments, the housing 12 has a thickness T1 of 1 mm to 5 mm.

In some embodiments, the housing 12 has a thickness T1 of 1 mm. In some embodiments, the housing 12 has a thickness T1 of 5 mm. In some embodiments, the housing 12 has a thickness T1 of 10 mm. In some embodiments, the housing 12 has a thickness T1 of 15 mm. In some embodiments, the housing 12 has a thickness T1 of 20 mm. In some embodiments, the housing 12 has a thickness T1 of 25 mm. In some embodiments, the housing 12 has a thickness T1 of 30 mm.

In some embodiments, the first connector 20 is a flat ribbon cable. In some embodiments, the second connector 22 is a flat ribbon cable. In some embodiments, the first connector 20 and the second connector 22 are integrated with the housing 12. In some embodiments, the first connector 20 and the second connector 22 are electrically connected to the electronic component 14. In some embodiments, the first connector 20 and the second connector 22 are overmolded into the housing 12.

In some embodiments, each of the first connector 20 and the second connector 22 has a thickness T2 of 1 mm to 10 mm. In some embodiments, each of the first connector 20 and the second connector 22 has a thickness T2 of 1 mm to 9 mm. In some embodiments, each of the first connector 20 and the second connector 22 has a thickness T2 of 1 mm to 8 mm. In some embodiments, each of the first connector 20 and the second connector 22 has a thickness T2 of 1 mm to 7 mm. In some embodiments, each of the first connector 20 and the second connector 22 has a thickness T2 of 1 mm to 6 mm. In some embodiments, each of the first connector 20 and the second connector 22 has a thickness T2 of 1 mm to 5 mm. In some embodiments, each of the first connector 20 and the second connector 22 has a thickness T2 of 1 mm to 4 mm. In some embodiments, each of the first connector 20 and the second connector 22 has a thickness T2 of 1 mm to 3 mm. In some embodiments, each of the first connector 20 and the second connector 22 has a thickness T2 of 1 mm to 2 mm.

In some embodiments, each of the first connector 20 and the second connector 22 has a thickness T2 of 2 mm to 10 mm. In some embodiments, each of the first connector 20 and the second connector 22 has a thickness T2 of 2 mm to 9 mm. In some embodiments, each of the first connector 20 and the second connector 22 has a thickness T2 of 2 mm to 8 mm. In some embodiments, each of the first connector 20 and the second connector 22 has a thickness T2 of 2 mm to 7 mm. In some embodiments, each of the first connector 20 and the second connector 22 has a thickness T2 of 2 mm to 6 mm. In some embodiments, each of the first connector 20 and the second connector 22 has a thickness T2 of 2 mm to 5 mm. In some embodiments, each of the first connector 20 and the second connector 22 has a thickness T2 of 2 mm to 4 mm. In some embodiments, each of the first connector 20 and the second connector 22 has a thickness T2 of 2 mm to 3 mm.

In some embodiments, each of the first connector 20 and the second connector 22 has a thickness T2 of 3 mm to 10 mm. In some embodiments, each of the first connector 20 and the second connector 22 has a thickness T2 of 3 mm to 9 mm. In some embodiments, each of the first connector 20 and the second connector 22 has a thickness T2 of 3 mm to 8 mm. In some embodiments, each of the first connector 20 and the second connector 22 has a thickness T2 of 3 mm to 7 mm. In some embodiments, each of the first connector 20 and the second connector 22 has a thickness T2 of 3 mm to 6 mm. In some embodiments, each of the first connector 20 and the second connector 22 has a thickness T2 of 3 mm to 5 mm. In some embodiments, each of the first connector 20 and the second connector 22 has a thickness T2 of 3 mm to 4 mm.

In some embodiments, each of the first connector 20 and the second connector 22 has a thickness T2 of 4 mm to 10 mm. In some embodiments, each of the first connector 20 and the second connector 22 has a thickness T2 of 4 mm to 9 mm. In some embodiments, each of the first connector 20 and the second connector 22 has a thickness T2 of 4 mm to 8 mm. In some embodiments, each of the first connector 20 and the second connector 22 has a thickness T2 of 4 mm to 7 mm. In some embodiments, each of the first connector 20 and the second connector 22 has a thickness T2 of 4 mm to 6 mm. In some embodiments, each of the first connector 20 and the second connector 22 has a thickness T2 of 4 mm to 5 mm.

In some embodiments, each of the first connector 20 and the second connector 22 has a thickness T2 of 5 mm to 10 mm. In some embodiments, each of the first connector 20 and the second connector 22 has a thickness T2 of 5 mm to 9 mm. In some embodiments, each of the first connector 20 and the second connector 22 has a thickness T2 of 5 mm to 8 mm. In some embodiments, each of the first connector 20 and the second connector 22 has a thickness T2 of 5 mm to 7 mm. In some embodiments, each of the first connector 20 and the second connector 22 has a thickness T2 of 5 mm to 6 mm. In some embodiments, each of the first connector 20 and the second connector 22 has a thickness T2 of 6 mm to 10 mm. In some embodiments, each of the first connector 20 and the second connector 22 has a thickness T2 of 6 mm to 9 mm. In some embodiments, each of the first connector 20 and the second connector 22 has a thickness T2 of 6 mm to 8 mm. In some embodiments, each of the first connector 20 and the second connector 22 has a thickness T2 of 6 mm to 7 mm. In some embodiments, each of the first connector 20 and the second connector 22 has a thickness T2 of 7 mm to 10 mm. In some embodiments, each of the first connector 20 and the second connector 22 has a thickness T2 of 7 mm to 9 mm. In some embodiments, each of the first connector 20 and the second connector 22 has a thickness T2 of 7 mm to 8 mm. In some embodiments, each of the first connector 20 and the second connector 22 has a thickness T2 of 8 mm to 10 mm. In some embodiments, each of the first connector 20 and the second connector 22 has a thickness T2 of 8 mm to 9 mm. In some embodiments, each of the first connector 20 and the second connector 22 has a thickness T2 of 9 mm to 10 mm.

In some embodiments, each of the first connector 20 and the second connector 22 has a thickness T2 of 1 mm. In some embodiments, each of the first connector 20 and the second connector 22 has a thickness T2 of 2 mm. In some embodiments, each of the first connector 20 and the second connector 22 has a thickness T2 of 3 mm. In some embodiments, each of the first connector 20 and the second connector 22 has a thickness T2 of 4 mm. In some embodiments, each of the first connector 20 and the second connector 22 has a thickness T2 of 5 mm. In some embodiments, each of the first connector 20 and the second connector 22 has a thickness T2 of 6 mm. In some embodiments, each of the first connector 20 and the second connector 22 has a thickness T2 of 7 mm. In some embodiments, each of the first connector 20 and the second connector 22 has a thickness T2 of 8 mm. In some embodiments, each of the first connector 20 and the second connector 22 has a thickness T2 of 9 mm. In some embodiments, each of the first connector 20 and the second connector 22 has a thickness T2 of 10 mm.

In some embodiments, the electrical component 10 is configured to be electrically connected to at least one photovoltaic module. In some embodiments, the electrical component 10 is configured to be electrically connected to a plurality of photovoltaic modules. In some embodiments, the electrical component 10 is a component that is separate and distinct from the photovoltaic module. In some embodiments, the electrical component 10 is not embedded within the photovoltaic module. In some embodiments, the electrical component 10 is configured to be disconnected from the first mating connector 24 and the second mating connector 26 while the photovoltaic module remains installed on the roof deck. In some embodiments, if the electronic component 14 requires an upgrade, repair or replacement, a user may disconnect the electrical component 10 from the first mating connector 24 and the second mating connector 26 and replace the electrical component 10 with a new electrical component, or have the electrical component 10 repaired and reinstalled, without the need to remove or uninstall the photovoltaic module from the roof deck. In some embodiments, an upgrade of the electronic component 10 may include a newer or latest model of same.

Figure 2:
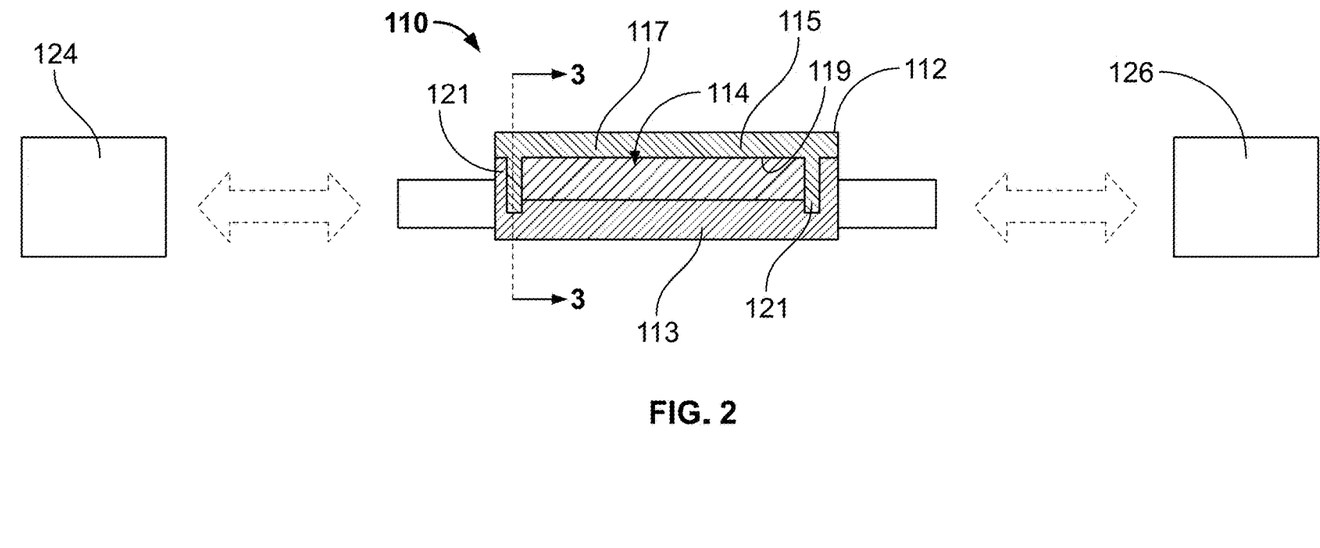
FIG. 2 is schematic view of another embodiment of an electrical component.
Figure 3:
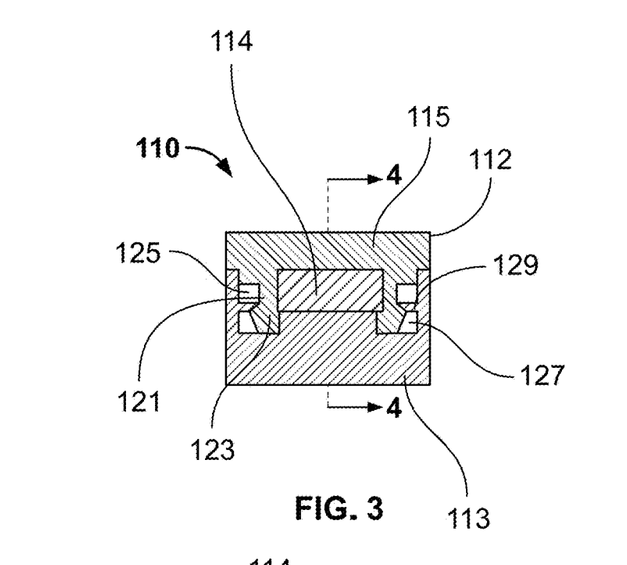
FIG. 3 is a cross-sectional view, taken along section lines A-A and looking in the direction of the arrows, of the electrical component shown in FIG. 2.
Figure 4:
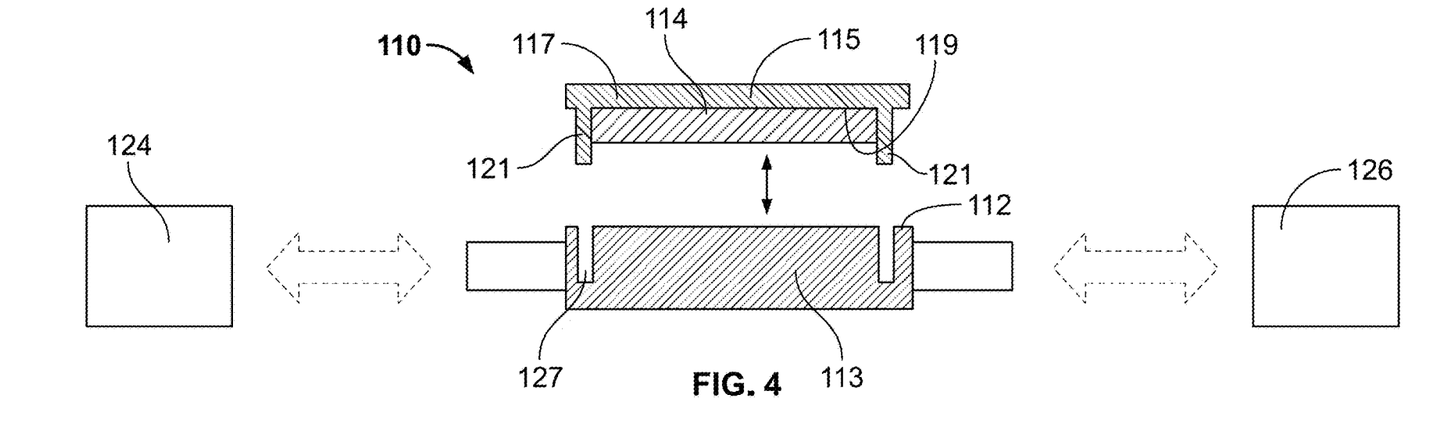
FIG. 4 is a schematic view of the electrical component shown in FIG. 2, with an electronic component employed by the electrical component removed from an associated housing.

FIGS. 2 through 4 show an embodiment of an electrical component 110. The electrical component 110 includes a structure and function similar to those of the electrical component 10 except as illustrated and described below. In some embodiments, the electrical component 110 includes a housing 112 having a base 113 and a cap 115 removably attached to the base 113. In some embodiments, an electronic component 114 is attached to the cap 115. In some embodiments, the electronic component 114 is removably attached to the cap 115. In some embodiments, the electronic component 114 is attached to the cap 115 by a fastener. In some embodiments, the electronic component 114 is attached to the cap 115 by an adhesive. In some embodiments, the electronic component 114 is attached to the cap 115 by ultrasonic welding. In some embodiments, the cap 115 includes a cover 117 having a first surface 119 and at least one tab 121 extending outwardly from the first surface 119. In some embodiments, the at least one tab 121 includes a plurality of the tabs 121. In some embodiments, each of the tabs 121 includes a hook member 123. In some embodiments, the electronic component 114 is located intermediate the tabs 121.

In some embodiments, the housing 112 is made from a thermoplastic material. In some embodiments, the housing 112 is made from poly (p-phenylene oxide)/poly(p-phenylene ether) (PPE). In some embodiments, the housing 112 is made from fiber-reinforced plastic (FRP). In some embodiments, the housing 112 is made from fiberglass reinforced polymers.

In some embodiments, the base 113 includes a pair of elongated slots 125, 127 extending longitudinally from a first end to a second end of the base 113. In some embodiments, tab portions 129 extend within each of the slots 125, 127. In some embodiments, the slots 125, 127 are sized and shaped to removably receive a corresponding one of the pair of tabs 121 of the cap 115, and the each of the tab portions 129 is sized and shaped to engage removably a corresponding one of the hook members 123 of the tabs 121. In some embodiments, the tabs 121 are pin connectors and the slots 125, 127 are sockets. In some embodiments, the tabs 121 and the slots 125, 127 include a blade-type connection system. In some embodiments, the tabs 121 and the slots 125, 127 include a spade or fork terminal connection system. In some embodiments, the tabs 121 and the slots 125, 127 include a universal serial bus (USB) connection system. In some embodiments, if the electronic component 114 requires an upgrade, repair or replacement, a user may remove the cap 115 which includes the electronic component 114, from the base 113 without the need to remove the housing 112 (e.g., the base 113) of the electrical component 110 from mating connectors 124, 126 or to remove or uninstall the photovoltaic module. In some embodiments, a user may upgrade or replace the electronic component 114 with a new or upgraded electronic component, or a repaired electronic component 114. In some embodiments, the upgrade to the electronic component 114 may be the result of changes, revisions or updates in governmental or industry standards, codes, and guidelines for roofing systems, photovoltaic systems, electronic systems, and/or electrical systems.

Figure 5:
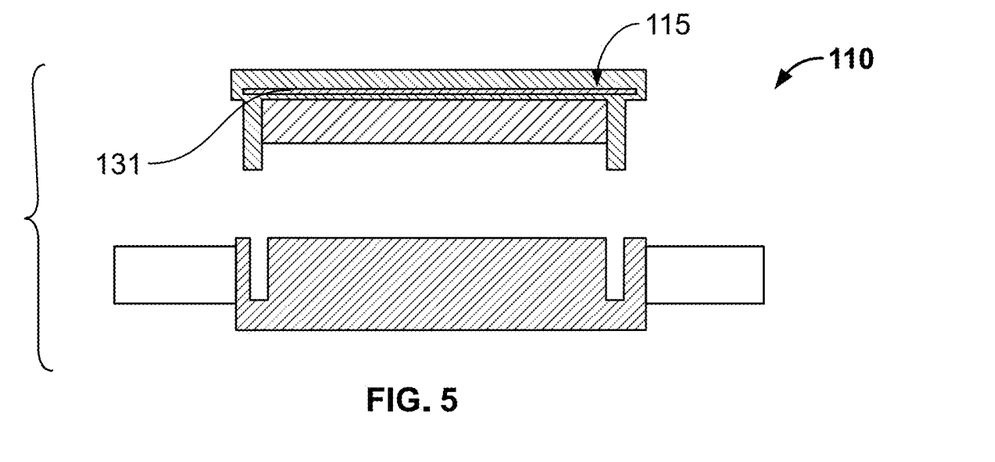
FIG. 5 is a schematic view of another embodiment of an electrical component, with an electronic component employed by the electrical component removed from an associated housing.
Figure 6:
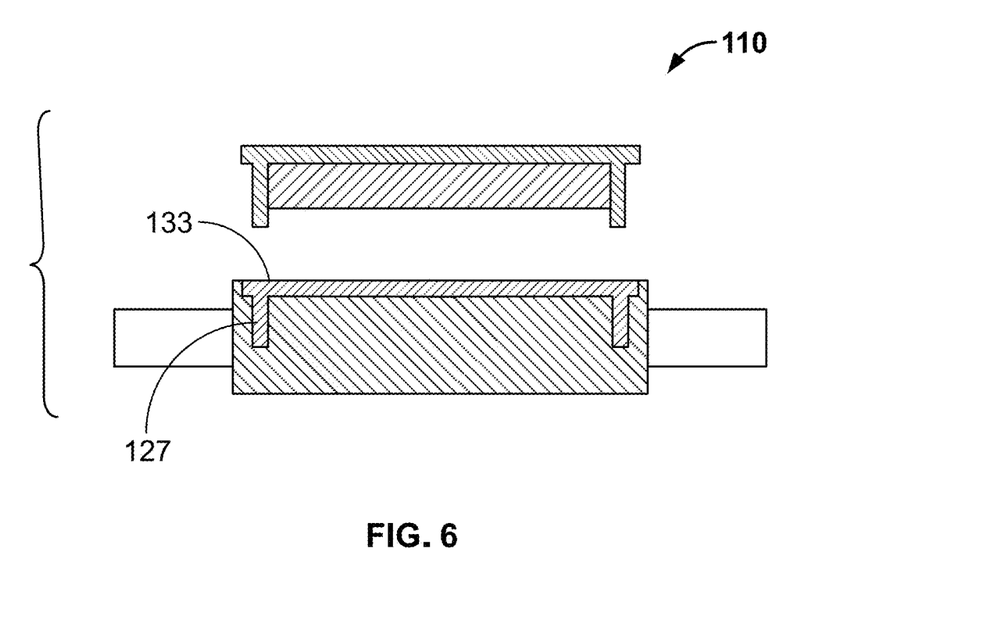
FIG. 6 is a schematic view of another embodiment of an electrical component, with an electronic component employed by the electrical component removed from an associated housing.

Referring to FIG. 5, in an embodiment, the electrical component 110 includes an O-ring 131 positioned on the cap 115. In some embodiments, the O-ring 131 resists water ingress within the housing 112 of the electrical component 110. In some embodiments, the O-ring 131 is a silicone O-ring. Referring to FIG. 6, in an embodiment, the electrical component 110 includes a gel 133. In some embodiments, the gel 133 is a silicone gel. In some embodiments, the slots 125, 127 of the housing 112 are filled with the gel 133. In some embodiments, the gel 133 resists water ingress within the housing 112 of the electrical component 110.

Figure 7A:
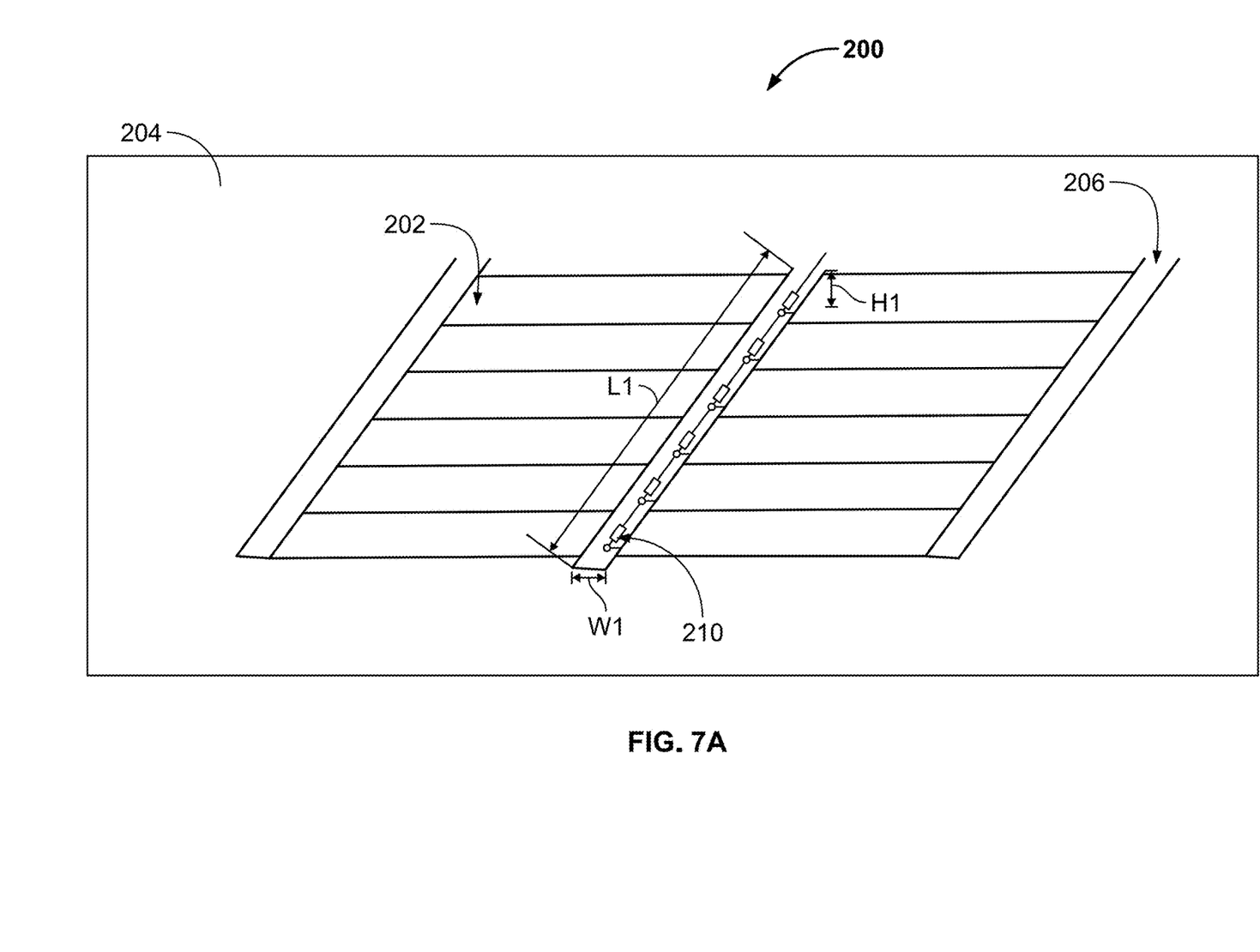
FIG. 7A is a top perspective schematic view of an embodiment of a photovoltaic system installed on a roof deck and including a plurality of embodiments of electrical components.
Figure 7B:
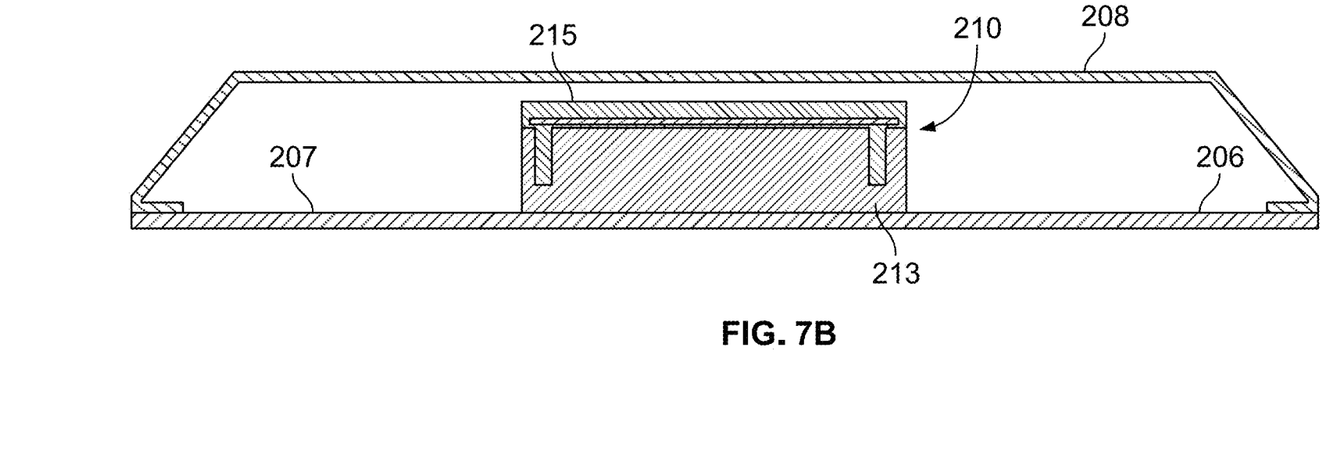
FIGS. 7B and 7C are side cross sectional views of embodiments of a wireway and cover.

Referring to FIGS. 7A and 7B, in some embodiments, a roofing system 200 includes a plurality of photovoltaic modules 202 installed on a roof deck 204, and at least one wireway 206 installed on the roof deck 204 proximate to the photovoltaic modules 202. In some embodiments, the at least one wireway 206 is installed intermediate the plurality of photovoltaic modules 202. In some embodiments, the at least one wireway 206 is installed proximate to inner ends of the photovoltaic modules 202. In some embodiments, the at least one wireway 206 is installed proximate to outer ends of the photovoltaic modules 202.

In some embodiments, the at least one wireway 206 is rectangular in shape. In some embodiments, the at least one wireway 206 is sized and shaped to receive at least one electrical component 210. In some embodiments, the at least one wireway 206 is sized and shaped to receive a plurality of the electrical components 210. In some embodiments, each of the electrical components 210 has a structure and function similar to those of the electrical component 10. In other embodiments, each of the electrical components 210 has a structure and function similar to those of the electrical component 110. In some embodiments, the electrical components 210 are electrically connected to one another. In some embodiments, the electrical component 210 is electrically connected to one of the photovoltaic modules 202. In some embodiments, the electrical component 210 is electrically connected to each of the photovoltaic modules 202.

Referring to FIG. 7B, in some embodiments, the at least one wireway 206 includes a cover 208. In some embodiments, the cover 208 is removably attached to the at least one wireway 206. In some embodiments, the at least one wireway 206 includes a single wireway installed proximate to the inner end of each of the plurality of photovoltaic modules 202. In some embodiments, the at least one wireway 206 includes a single wireway installed proximate to the outer end of each of the plurality of photovoltaic modules 202. In some embodiments, the cover 208 covers the electrical components 210 when installed within the wireway 206. In some embodiments, a base 213 of the electrical component 210 is juxtaposed with a surface 207 of the wireway 206. In some embodiments, a base 213 of the electrical component 210 is located on the surface 207 of the wireway 206. In some embodiments, the base 213 is attached to the surface 207 of the wireway 206. In some embodiments, the base 213 is attached to the surface 207 of the wireway 206 by an adhesive. In some embodiments, the base 213 is ultrasonically welded to the surface 207. In some embodiments, the base 213 is heat welded to the surface 207. In some embodiments, the base 213 is thermally bonded to the surface 207. In some embodiments, the base 213 is not adhered or attached to the surface 207. In some embodiments, a cap 215 including the electronic component 214 is removably attached to the base 213.

Figure 7C:
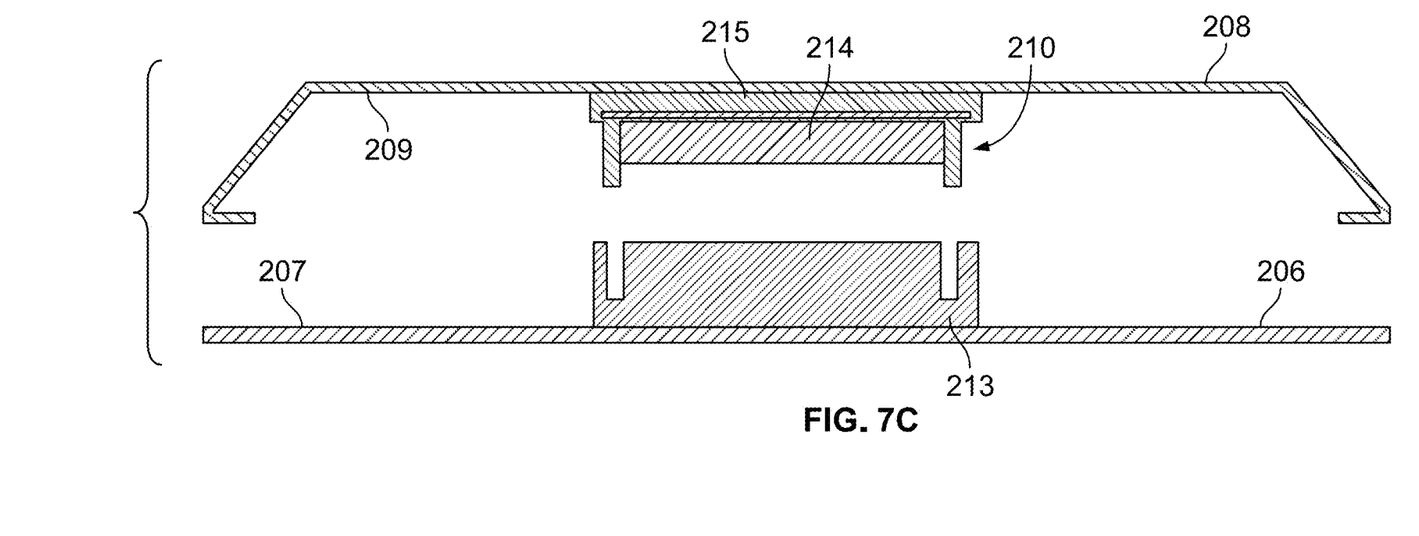
Figure 8:
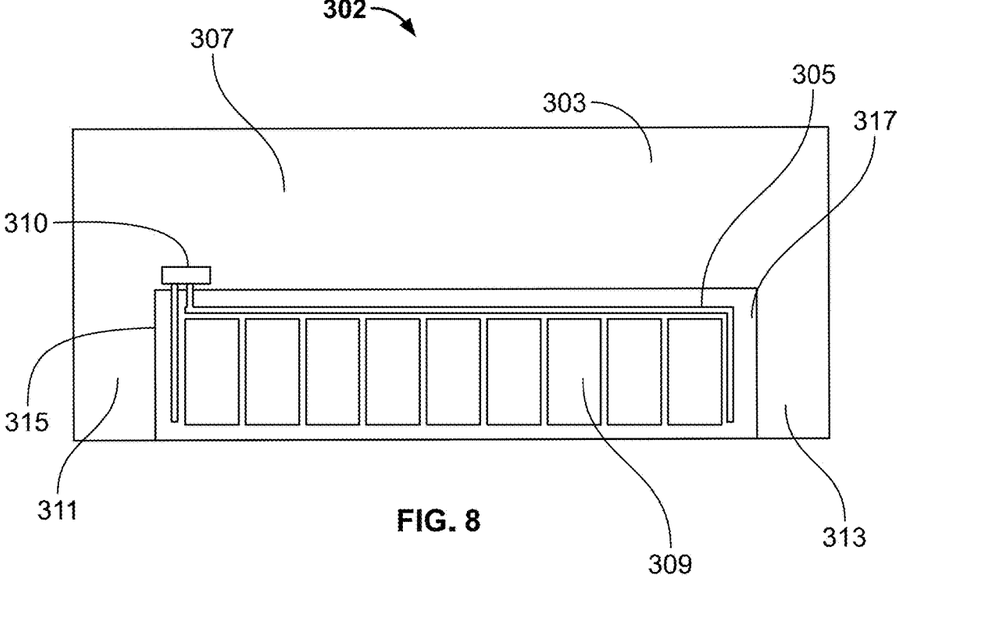
FIGS. 8 and 9 are top plan schematic views of embodiments of a photovoltaic module including embodiments of an electrical component.
Figure 9:
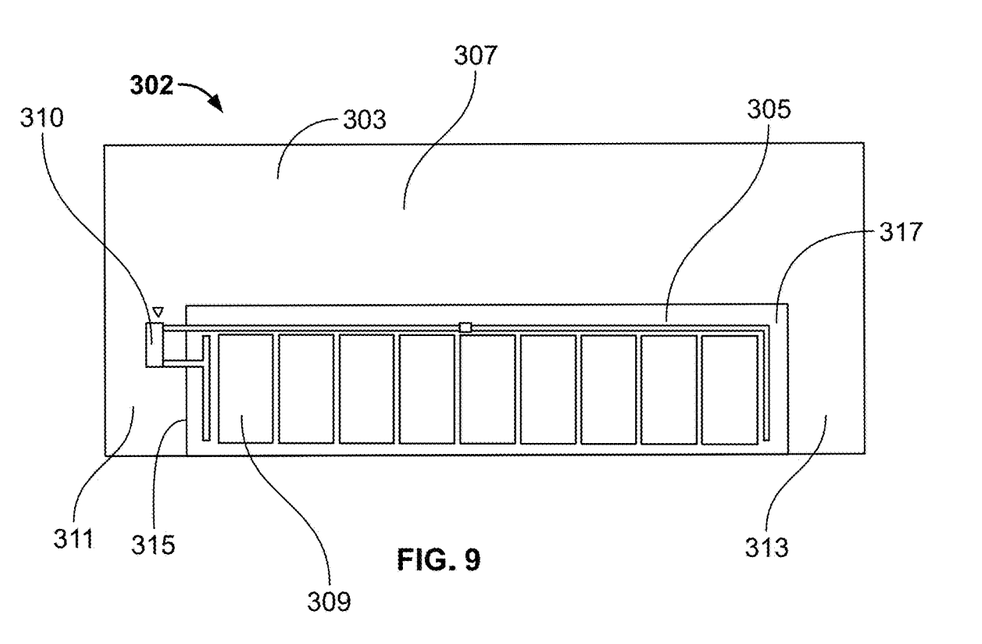

Referring to FIG. 7C, in some embodiments, the cap 215 is attached to an interior surface 209 of the cover 208. In some embodiments, the cap 215 is attached to the interior surface 209 of the wireway 206 by an adhesive. In some embodiments, the cap 215 is ultrasonically welded to the interior surface 209. In some embodiments, the cap 215 is heat welded to the interior surface 209. In some embodiments, the cap 215 is thermally bonded to the interior surface 209. In some embodiments, the cap 215 is not adhered or attached to the interior surface 209. In some embodiments, the cap 215 is removably attached to the base 213 when the cover 208 is installed on the surface 207 of the wireway 206. In some embodiments, the electronic component 214 is electronically connected to the photovoltaic system when the when the cover 208 is installed on the surface 207 of the wireway 206. In some embodiments, the electronic component 214 is removable from the cap 215 when the cover 208 in uninstalled from the wireway 206.

In some embodiments, the wireway 206 includes a length L1 of 100 mm to 450 mm. In some embodiments, the wireway 206 includes a length L1 of 100 mm to 400 mm. In some embodiments, the wireway 206 includes a length L1 of 100 mm to 350 mm. In some embodiments, the wireway 206 includes a length L1 of 100 mm to 300 mm. In some embodiments, the wireway 206 includes a length L1 of 100 mm to 250 mm. In some embodiments, the wireway 206 includes a length L1 of 100 mm to 200 mm. In some embodiments, the wireway 206 includes a length L1 of 100 mm to 150 mm.

In some embodiments, the wireway 206 includes a length L1 of 150 mm to 450 mm. In some embodiments, the wireway 206 includes a length L1 of 150 mm to 400 mm. In some embodiments, the wireway 206 includes a length L1 of 150 mm to 350 mm. In some embodiments, the wireway 206 includes a length L1 of 150 mm to 300 mm. In some embodiments, the wireway 206 includes a length L1 of 150 mm to 250 mm. In some embodiments, the wireway 206 includes a length L1 of 150 mm to 200 mm.

In some embodiments, the wireway 206 includes a length L1 of 200 mm to 450 mm. In some embodiments, the wireway 206 includes a length L1 of 200 mm to 400 mm. In some embodiments, the wireway 206 includes a length L1 of 200 mm to 350 mm. In some embodiments, the wireway 206 includes a length L1 of 200 mm to 300 mm. In some embodiments, the wireway 206 includes a length L1 of 200 mm to 250 mm.

In some embodiments, the wireway 206 includes a length L1 of 250 mm to 450 mm. In some embodiments, the wireway 206 includes a length L1 of 250 mm to 400 mm. In some embodiments, the wireway 206 includes a length L1 of 250 mm to 350 mm. In some embodiments, the wireway 206 includes a length L1 of 250 mm to 300 mm.

In some embodiments, the wireway 206 includes a length L1 of 300 mm to 450 mm. In some embodiments, the wireway 206 includes a length L1 of 300 mm to 400 mm. In some embodiments, the wireway 206 includes a length L1 of 300 mm to 350 mm. In some embodiments, the wireway 206 includes a length L1 of 350 mm to 450 mm. In some embodiments, the wireway 206 includes a length L1 of 350 mm to 400 mm. In some embodiments, the wireway 206 includes a length L1 of 400 mm to 450 mm.

In some embodiments, the wireway 206 includes a width W1 of 100 mm to 200 mm. In some embodiments, the wireway 206 includes a width W1 of 100 mm to 175 mm. In some embodiments, the wireway 206 includes a width W1 of 100 mm to 150 mm. In some embodiments, the wireway 206 includes a width W1 of 100 mm to 125 mm.

In some embodiments, the wireway 206 includes a width W1 of 125 mm to 200 mm. In some embodiments, the wireway 206 includes a width W1 of 125 mm to 175 mm. In some embodiments, the wireway 206 includes a width W1 of 125 mm to 150 mm. In some embodiments, the wireway 206 includes a width W1 of 150 mm to 200 mm. In some embodiments, the wireway 206 includes a width W1 of 150 mm to 175 mm. In some embodiments, the wireway 206 includes a width W1 of 175 mm to 200 mm.

In some embodiments, the wireway 206 includes a height H1 of 5 mm to 35 mm. In some embodiments, the wireway 206 includes a height H1 of 5 mm to 30 mm. In some embodiments, the wireway 206 includes a height H1 of 5 mm to 25 mm. In some embodiments, the wireway 206 includes a height H1 of 5 mm to 20 mm. In some embodiments, the wireway 206 includes a height H1 of 5 mm to 15 mm. In some embodiments, the wireway 206 includes a height H1 of 5 mm to 10 mm. In some embodiments, the wireway 206 includes a height H1 of 10 mm to 35 mm. In some embodiments, the wireway 206 includes a height H1 of 10 mm to 30 mm. In some embodiments, the wireway 206 includes a height H1 of 10 mm to 25 mm. In some embodiments, the wireway 206 includes a height H1 of 10 mm to 20 mm. In some embodiments, the wireway 206 includes a height H1 of 10 mm to 15 mm.

In some embodiments, the wireway 206 includes a height H1 of 15 mm to 35 mm. In some embodiments, the wireway 206 includes a height H1 of 15 mm to 30 mm. In some embodiments, the wireway 206 includes a height H1 of 15 mm to 25 mm. In some embodiments, the wireway 206 includes a height H1 of 15 mm to 20 mm. In some embodiments, the wireway 206 includes a height H1 of 20 mm to 35 mm. In some embodiments, the wireway 206 includes a height H1 of 20 mm to 30 mm. In some embodiments, the wireway 206 includes a height H1 of 20 mm to 25 mm. In some embodiments, the wireway 206 includes a height H1 of 25 mm to 35 mm. In some embodiments, the wireway 206 includes a height H1 of 25 mm to 30 mm. In some embodiments, the wireway 206 includes a height H1 of 30 mm to 35 mm.

In some embodiments, the wireway 206 includes a height H1 of 5 mm. In some embodiments, the wireway 206 includes a height H1 of 10 mm. In some embodiments, the wireway 206 includes a height H1 of 15 mm. In some embodiments, the wireway 206 includes a height H1 of 20 mm. In some embodiments, the wireway 206 includes a height H1 of 25 mm. In some embodiments, the wireway 206 includes a height H1 of 30 mm. In some embodiments, the wireway 206 includes a height H1 of 35 mm.

In some embodiments, the wireway 206 is made from a polymeric material. In some embodiments, the wireway 206 is made from polypropylene. In some embodiments, the wireway 206 is made from polyethylene. In some embodiments, the wireway 206 is made from metal. In some embodiments, the wireway 206 is made from aluminum.

In some embodiments, the at least one wireway 206 is moisture resistant. As used herein, the term "moisture resistant" means having a water transmission rate of less than or equal to 0.05 U.S. perms, as measured by ASTM E 96, Procedure B-Standard Test Methods for Water Vapor Transmission of Materials. In some embodiments, the wireway 206 withstands walking loads/step resistance that conforms to standards under UL 3741 test standards (UL Standard for Safety Photovoltaic Hazard Control). In some embodiments, the wireway 206 includes an axe impact resistance that conforms to standards under UL 3741 test standards. In some embodiments, the wireway 206 includes a body fall resistance that conforms to standards under UL 3741 test standards.

Referring to FIGS. 8 through 11, in an embodiment, a roofing system 300 includes a plurality of photovoltaic modules 302 installed on a roof deck 304. In some embodiments, each of the photovoltaic modules 302 includes a first layer 303 and a second layer 305 overlaying the first layer 303. In some embodiments, the first layer 303 includes a head lap 307. In some embodiments, the second layer 305 includes at least one solar cell 309. In some embodiments, the at least one solar cell 309 includes a plurality of the solar cells 309. In some embodiments, at least one of the plurality of photovoltaic modules 302 overlays at least the head lap 307 of another of the plurality of photovoltaic modules 302.

In some embodiments, the first layer 303 includes a first step flap 311 adjacent an end 315 of the second layer 305 and a second step flap 313 adjacent an opposite end 317 of the second layer 305. In some embodiments, the first step flap 311 of at least one of the plurality of photovoltaic modules 302 overlays at least the second step flap 313 of another of the plurality of photovoltaic modules 302. In some embodiments, the second step flap 313 of at least one of the plurality of photovoltaic modules 302 overlays at least the first step flap 311 of another of the plurality of photovoltaic modules 302.

In some embodiments, each of the first layer 303 and the second layer 305 includes a polymer. In some embodiments, each of the first layer 303 and the second layer 305 includes thermoplastic polyolefin (TPO). In some embodiments, each of the first layer 303 and the second layer 305 includes a material selected from the group consisting of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), and blends thereof.

In some embodiments, the first layer 303 and the second layer 305 are laminated. In some embodiments, the second layer 305 is ultrasonically welded to the first layer 303. In some embodiments, the second layer 305 is heat welded to the first layer 303. In some embodiments, the second layer 305 is thermally bonded to the first layer 303.

In some embodiments, the first layer 303 has a thickness of 1 mm to 20 mm. In some embodiments, the first layer 303 has a thickness of 1 mm to 15 mm. In some embodiments, the first layer 303 has a thickness of 1 mm to 10 mm. In some embodiments, the first layer 303 has a thickness of 1 mm to 5 mm. In some embodiments, the first layer 303 has a thickness of 1 mm to 4 mm. In some embodiments, the first layer 303 has a thickness of 1 mm to 3 mm. In some embodiments, the first layer 303 has a thickness of 1 mm to 2 mm. In some embodiments, the first layer 303 has a thickness of 5 mm to 20 mm. In some embodiments, the first layer 303 has a thickness of 5 mm to 15 mm. In some embodiments, the first layer 303 has a thickness of 5 mm to 10 mm. In some embodiments, the first layer 303 has a thickness of 10 mm to 20 mm. In some embodiments, the first layer 303 has a thickness of 10 mm to 15 mm. In some embodiments, the first layer 303 has a thickness of 15 mm to 20 mm.

In some embodiments, the first layer 303 has a thickness of 1 mm. In some embodiments, the first layer 303 has a thickness of 1.5 mm. In some embodiments, the first layer 303 has a thickness of 2 mm. In some embodiments, the first layer 303 has a thickness of 2.5 mm. In some embodiments, the first layer 303 has a thickness of 3 mm. In some embodiments, the first layer 303 has a thickness of 3.5 mm. In some embodiments, the first layer 303 has a thickness of 4 mm.

In some embodiments, the first layer 303 has a thickness of 4.5 mm. In some embodiments, the first layer 303 has a thickness of 5 mm. In some embodiments, the first layer 303 has a thickness of 10 mm. In some embodiments, the first layer 303 has a thickness of 15 mm. In some embodiments, the first layer 303 has a thickness of 20 mm. In some embodiments, the first layer 303 has a thickness of 25 mm. In some embodiments, the first layer 303 has a thickness of 30 mm.

In some embodiments, the plurality of photovoltaic modules 302 is installed directly to the roof deck 304. In some embodiments, each of the plurality of photovoltaic modules 302 is installed on the roof deck 304 by a plurality of fasteners. In some embodiments, the plurality of fasteners are installed through the head lap 307. In some embodiments, the plurality of fasteners includes a plurality of nails. In some embodiments, each of the plurality of photovoltaic modules 302 is installed on the roof deck 304 by an adhesive. In some embodiments, the roofing system 300 includes an underlayment layer installed on the roof deck 304. In some embodiments, the plurality of photovoltaic modules 302 overlay the underlayment layer.

In some embodiments, at least one electrical component 310 is electrically connected to a corresponding one of the plurality of photovoltaic modules 302. In some embodiments, the at least one electrical component 310 includes a plurality of electrical components 310. In some embodiments, the at least one electrical component 310 has a structure and function similar to the electrical component 10.

In some embodiments, the at least one electrical component 310 is located proximate to the head lap 307 of the corresponding one of the plurality of photovoltaic modules 302. In some embodiments, the at least one electrical component 310 is located on a surface of the head lap 307. In some embodiments, the at least one electrical component 310 is located on a surface of the head lap 307 proximate to the second layer 305.

In other embodiments, the at least one electrical component 310 has a structure and function similar to the electrical component 110. In some embodiments, the base 113 of the housing 112 of the at least one electrical component 310 is embedded within the head lap 307. As used herein, the term "embedded" means partially or fully enveloped or enclosed, and with respect to certain embodiments of the electrical component 310, the base 113 of the housing 112 is partially enveloped by or enclosed within the head lap 307. In some embodiments, the base 113 of the housing 112 is laminated with the head lap 307. In some embodiments, the base 113 of the housing 112 is attached to the head lap 307 by an adhesive. In some embodiments, the base 113 is ultrasonically welded to the head lap 307. In some embodiments, the base 113 is heat welded to the head lap 307. In some embodiments, the base 113 is thermally bonded to the head lap 307. In some embodiments, the base 113 is not adhered or attached to the head lap 307.

In some embodiments, the at least one electrical component 310 is located proximate to the first step flap 311 of the corresponding one of the plurality of photovoltaic modules 302. In some embodiments, the at least one electrical component 310 is located on a surface of the first step flap 311. In some embodiments, the at least one electrical component 310 is located on a surface of the first step flap 311 proximate to the second layer 305.

In some embodiments, the at least one electrical component 310 is located proximate to the second step flap 313 of the corresponding one of the plurality of photovoltaic modules 302. In some embodiments, the at least one electrical component 310 is located on a surface of the second step flap 313. In some embodiments, the at least one electrical component 310 is located on a surface of the second step flap 313 proximate to the second layer 305.

In other embodiments, the at least one electrical component 310 has a structure and function similar to the electrical component 110. In some embodiments, the base 113 of the housing 112 of the at least one electrical component 310 is embedded within the first step flap 311. In some embodiments, the base 113 of the housing 112 of the at least one electrical component 310 is embedded within the second step flap 313. As used herein, the term "embedded" means partially or fully enveloped or enclosed, and with respect to certain embodiments of the electrical component 310, the base 113 of the housing 112 is partially enveloped by or enclosed within the first step flap 311 or the second step flap 313, as applicable. In some embodiments, the base 113 of the housing 112 is laminated with the first step flap 311. In some embodiments, the base 113 of the housing 112 of the electrical component 310 is attached to the first step flap 311 by an adhesive. In some embodiments, the base 113 is ultrasonically welded to the first step flap 311. In some embodiments, the base 113 is heat welded to the first step flap 311. In some embodiments, the base 113 is thermally bonded to the first step flap 311. In some embodiments, the base 113 of the housing 112 is laminated with the second step flap 313. In some embodiments, the base 113 of the housing 112 of the electrical component 310 is attached to the second step flap 313 by an adhesive. In some embodiments, the base 113 is ultrasonically welded to the second step flap 313. In some embodiments, the base 113 is heat welded to the second step flap 313. In some embodiments, the base 113 is thermally bonded to the second step flap 313.

Figure 10:
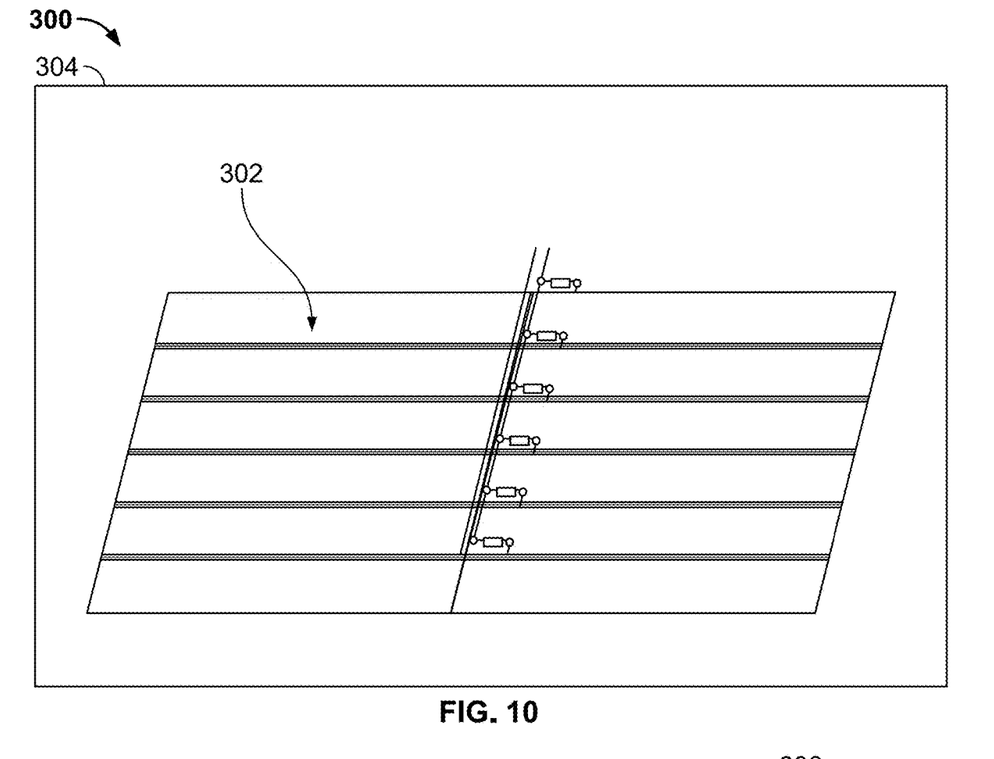
FIGS. 10 and 11 are a top perspective and side elevational schematic views of an embodiment of a photovoltaic system installed on a roof deck and including a plurality of embodiments of electrical components.
Figure 11:
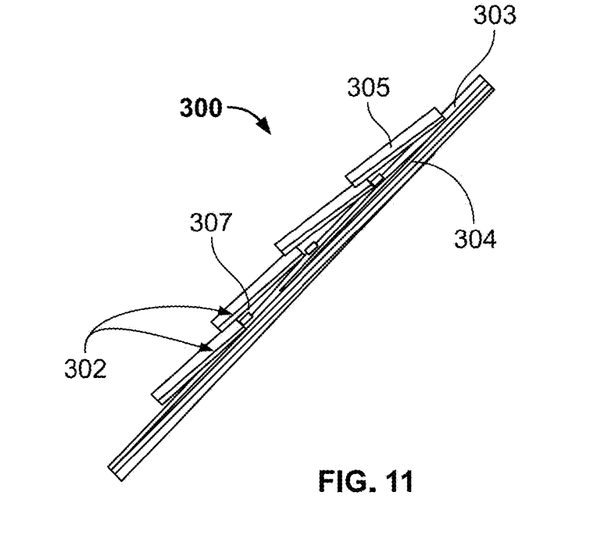

Referring to FIGS. 10 and 11, in an embodiment, the electrical component 310 of one of the plurality of photovoltaic modules 202 is located beneath the head lap 307 of the another overlaying one of the photovoltaic modules 202. In some embodiments, the electrical component 310 of one of the plurality of photovoltaic modules 202 located proximate to or on the first step flap 311 thereof is located beneath the second step flap 313 of the another overlaying one of the photovoltaic modules 202. In some embodiments, the electrical component 310 of one of the plurality of photovoltaic modules 202 located proximate to or on the second step flap 313 thereof is located beneath the first step flap 311 of the another overlaying one of the photovoltaic modules 202.

What is claimed is:

1. A system, comprising:
    a plurality of photovoltaic modules installed on a roof deck,
        wherein each of the plurality of photovoltaic modules includes a head lap; and
    a plurality of electrical components, each of which is electrically connected to a corresponding one of the plurality of photovoltaic modules,
        wherein each of the plurality of electrical components is located on the head lap of the corresponding one of the plurality of photovoltaic modules,
        wherein each of the plurality of electrical components includes
            a base,
                wherein the base is electrically connected to the at least corresponding one of the plurality of photovoltaic modules, and
            a cap,
                wherein the cap includes an electronic component,
                wherein the cap is moveable between an installed position, in which the cap is attached to the base and the electronic component is mechanically and electrically connected to the base, and a disconnected position, in which the cap is removed from the base and the electronic component is mechanically and electrically disconnected from the base.

2. The system of claim 1, wherein when the cap is in the disconnected position, the base remains electrically connected to the photovoltaic module.

3. The system of claim 2, wherein when the cap is in the disconnected position, the photovoltaic module remains installed on the roof deck.

4. The system of claim 1, wherein the electronic component includes at least one of an optimizer, a rapid shutdown device, an inverter, or a diode.

5. The system of claim 1, wherein the electronic component is a component of a junction box.

6. The system of claim 1, wherein each of the plurality of photovoltaic modules includes a side lap, and wherein the corresponding one of the plurality of electrical components is located on the side lap.

7. The system of claim 6, wherein the plurality of photovoltaic modules is arranged in an array, wherein a first photovoltaic module of the plurality of photovoltaic modules is vertically adjacent to a second photovoltaic module of the plurality of photovoltaic modules, and wherein the side lap of the first photovoltaic module and the side lap of the second photovoltaic module form a wireway, and wherein the plurality of electrical components is located within the wireway.

8. The system of claim 7, further comprising at least one cover, wherein the at least one cover is removably attached to the wireway.

9. The system of claim 8, wherein the base of at least one of the plurality of electrical components is installed within the wireway, wherein the cap of the at least one of the plurality of electrical components is attached to one of the at least one cover, and wherein the electronic component of the at least one of the plurality of electrical components is mechanically and electrically connected to the base of the at least one of the plurality of electrical components when the at least one cover is attached to the wireway.

10. The system of claim 9, wherein the base of each of the plurality of electrical components is installed within the wireway, wherein the at least one cover includes a plurality of covers, wherein the cap of each of the plurality of electrical components is attached to a corresponding one of the plurality of covers, and wherein the electronic component of each of the plurality of electrical components is mechanically and electrically connected to the base of the corresponding one of the plurality of electrical components.

11. A system, comprising:
    at least one photovoltaic module installed on a roof deck; and
    at least one electrical component electrically connected to the at least one photovoltaic module,
        wherein the at least one electrical component is proximate to the at least one photovoltaic module,
        wherein the at least one electrical component includes
            a base,
                wherein the base includes an upper surface, a first slot in the upper surface, and a second slot in the upper surface,
                wherein the base is electrically connected to the at least one photovoltaic module, and a cap,
   wherein the cap includes an inner surface, a first tab extending from the inner surface, and a second tab extending from the inner surface,
   wherein the cap includes an electronic component,
   wherein the cap is moveable between
      an installed position, in which the cap is attached to the base and the electronic component is mechanically and electrically connected to the base, and wherein each of the first slot and the second slot removably receives a corresponding one of the first tab and the second tab, and
      a disconnected position, in which the cap is removed from the base and the electronic component is mechanically and electrically disconnected from the base.

12. The system of claim 11, wherein each of the first slot and the second slot includes a socket, and wherein each of the first tab and the second tab includes a pin.

13. The system of claim 12, wherein the base includes a first end and a second end opposite the first end, a first side extending from the first end to the second end, a second side opposite the first side and extending from the first end to the second end, wherein each of the first slot and the second slot extends longitudinally from the first end to the second end, wherein the cap includes a first end and a second end opposite the first end of the cap, a first side extending from the first end of the cap to the second end of the cap, a second side extending from the first end of the cap to the second end of the cap, wherein the first tab is proximate to the first side of the cap and the second tab is proximate to the second side of the cap.

14. The system of claim 13, wherein each of the first tab and the second tab extends longitudinally from the first end of the cap to the second end of the cap.

15. The system of claim 14, wherein the electronic component is attached to the inner surface of the cap between the first tab and the second tab.

16. A system, comprising:
   a plurality of photovoltaic modules installed on a roof deck,
      wherein each of the plurality of photovoltaic modules includes a head lap; and
   a plurality of electrical components electrically connected to a corresponding one of the plurality of photovoltaic modules,
      wherein each of the plurality of electrical components is located on the headlap of the corresponding one of the plurality of photovoltaic modules,
      wherein each of the plurality of electrical components includes
         a base,
            wherein the base is electrically connected to the corresponding one of the plurality of photovoltaic modules, and
         a cap,
            wherein the cap includes an electronic component, wherein the electronic component includes at least one of an optimizer, a rapid shutdown device, an inverter, or a diode,
            wherein the cap is moveable between an installed position, in which the cap is attached to the base and the electronic component is mechanically and electrically connected to the base, and a disconnected position, in which the cap is removed from the base and the electronic component is mechanically and electrically disconnected from the base, and
            wherein when the cap is in the disconnected position, the base remains electrically connected to the corresponding one of the plurality of photovoltaic modules.

* * * * *